US009684782B2

(12) United States Patent
Yang et al.

(10) Patent No.: US 9,684,782 B2
(45) Date of Patent: Jun. 20, 2017

(54) SYSTEM FOR PROCESSING LOST PASSWORD USING PASSWORD LONG-TERM MEMORY OF USER, AND METHOD FOR PROCESSING LOST PASSWORD

(71) Applicant: Rowem Inc., Guro-gu, Seoul (KR)

(72) Inventors: Giho Yang, Seoul (KR); Jaeyeob Hwang, Goyang-si (KR)

(73) Assignee: Rowem Inc. (KR)

( * ) Notice: Subject to any disclaimer, the term of this patent is extended or adjusted under 35 U.S.C. 154(b) by 7 days.

(21) Appl. No.: 14/418,830

(22) PCT Filed: Aug. 1, 2013

(86) PCT No.: PCT/KR2013/006964
§ 371 (c)(1),
(2) Date: Apr. 20, 2015

(87) PCT Pub. No.: WO2014/021668
PCT Pub. Date: Feb. 6, 2014

(65) Prior Publication Data
US 2015/0294106 A1  Oct. 15, 2015

(30) Foreign Application Priority Data

Aug. 1, 2012 (KR) .................. 10-2012-0084624
Sep. 24, 2012 (KR) .................. 10-2012-0105590
Jul. 31, 2013 (KR) .................. 10-2013-0090892

(51) Int. Cl.
G06F 21/00 (2013.01)
H04L 29/06 (2006.01)
G06F 21/45 (2013.01)

(52) U.S. Cl.
CPC ...... *G06F 21/45* (2013.01); *G06F 2221/2131* (2013.01); *G06F 2221/2135* (2013.01)

(58) Field of Classification Search
CPC ............. G06F 21/45; G06F 2221/2135; G06F 2221/2131
See application file for complete search history.

(56) References Cited

U.S. PATENT DOCUMENTS 8,302,152 B1 * 10/2012 Hewinson ............... H04L 63/10
455/410
8,863,243 B1 * 10/2014 Lidzborski ............ G06F 21/316
709/245

(Continued)

FOREIGN PATENT DOCUMENTS

JP   2012-146337   *   8/2012
KR   2002-0020141       3/2002

(Continued)

OTHER PUBLICATIONS

International Search Report for International Application No. PCT/KR2013/006964 dated Oct. 1, 2013, 4 pages, Republic of Korea.

*Primary Examiner* — Lisa Lewis
(74) *Attorney, Agent, or Firm* — Thorpe North & Western

(57) ABSTRACT

The present invention relates to a system and method for processing a lost password by selectively providing a reset process under the password in the long-term memory of the user. According to the present invention, the system includes a user terminal including: a long-term memory condition registration unit receiving the registration of long-term memory conditions; a long-term condition determination unit determining the long-term memory conditions are satisfied; a user identification unit, after the occurrence of a lost password, authenticating the user through a user identification verification scheme or through a enhanced user identification verification scheme whether or not the password resides in the long-term memory of the user, and a lost state resetting unit cancelling the lost password occurrence state. According to the present invention, provided are an identi- (Continued)

fication verification service or an enhanced identification authentication service whether or not the password resides in the long term memory of user.

22 Claims, 7 Drawing Sheets

(56) References Cited

U.S. PATENT DOCUMENTS

| | | | |
|---|---|---|---|
| 2006/0215883 A1* | 9/2006 | Kim | G06K 9/00496 382/115 |
| 2008/0077984 A1 | 3/2008 | Kim | |
| 2009/0288143 A1* | 11/2009 | Stebila | G06F 21/445 726/3 |
| 2012/0159600 A1* | 6/2012 | Takagi | G06F 21/32 726/7 |

FOREIGN PATENT DOCUMENTS

| | | |
|---|---|---|
| KR | 2004-0039946 | 5/2004 |
| KR | 2005-0006971 | 1/2005 |
| KR | 2005-0074811 | 7/2005 |
| KR | 10-2006-0058604 | 5/2006 |
| KR | 2007-0056578 | 6/2007 |
| KR | 10-0756336 | 9/2007 |
| KR | 2012-0088982 | 8/2012 |

\* cited by examiner

SYSTEM FOR PROCESSING LOST PASSWORD USING PASSWORD LONG-TERM MEMORY OF USER, AND METHOD FOR PROCESSING LOST PASSWORD

TECHNICAL FIELD

The present disclosure relates to lost password processing, and more particularly, to a system for processing a lost password that provides cancellation processing of a lost password based on whether or not a user has long-term memory of the password and a method for processing a lost password.

The present application claims priority to the following three earlier applications, the disclosures of which are incorporated herein by reference:

Application No. 1: Korean Patent Application No. 10-2012-0084624 filed in the Republic of Korea on Aug. 1, 2012

Application No. 2: Korean Patent Application No. 10-2012-0105590 filed in the Republic of Korea on Sep. 24, 2012

Application No. 3: Korean Patent Application No. 10-2013-0090892 filed in the Republic of Korea on Jul. 31, 2013

BACKGROUND ART

A user terminal uses password technology as one of technologies for justifiable user authentication. When a user succeeds password authentication in a user terminal, the user can manipulate the user terminal, and when the user fails the authentication, the manipulation of the user terminal is limited. Then, as notified via the user terminal, the user performs a user identity verification process using the user terminal or other terminals, and when the user's identity is confirmed, the user is provided with the preset password or sets a new password in the user terminal.

Here, continuous authentication failures of passwords inputted from the user imply that the user does not remember a password, that is, the user forgot the password. When a user sets a password, the set password is stored as short-term memory and changes to long-term memory with the passage of time. For a period during which the password is stored as short-term memory, a possibility that the user does not remember the password, that is, the user will forget the password is high, and for a period during which the password is stored as long-term memory, such possibility is relatively low.

Considering the password memory characteristics based on short-term memory and long-term memory, one unreasonable fact is found. The unreasonable fact is that the possibility that the user will forget the password after long-term memory of the password is very low, but in the case where the user forgets the password, the user terminal provides a cancellation service of the password in the same processing fashion, no matter whether long-term memory of the password or short-term memory of the password.

If the user fails password authentication corresponding to primary authentication, user identity verification corresponding to secondary authentication is required. Also, when the user's identity is confirmed, the failure of the primary password authentication is invalidated. Here, more attention to the required user identity verification is needed. For example, when a third party has personal information of the user, the third party may readily succeed primary password authentication after the third party succeeds user identity verification using the personal information of the user.

DISCLOSURE

Technical Problem

The present disclosure is designed to solve the problem of the related art, and therefore, the present disclosure is directed to providing a system for processing a lost password that determines whether or not a user who forgot a password has long-term memory of the password and provides cancellation processing of the lost password differently based on a result of the determination and a method for processing a lost password.

The present disclosure is also directed to providing an enhanced user identity verification service that performs user identity verification through an acquaintance of a user to which the user made a call when the user identity verification is required to cancel a lost state of a password.

Technical Solution

To achieve the object, a system for processing a lost password using a user's long-term memory of the password according to the present disclosure includes a user terminal including a long-term memory condition registration unit configured to receive registration of a long-term memory condition for determining whether a user has long-term memory of a password, a long-term memory condition determination unit configured to determine whether the long-term memory condition of the user is satisfied each time authentication processing of the password is attempted, a user identity verification unit configured to, in the event that a lost password is determined to have occurred due to failed authentication of the password, when non-long-term memory of the user is determined, perform authentication processing using a user identity verification technique registered upon setting the password, and when long-term memory of the user is determined, perform authentication processing using a user identity verification technique with an enhanced authentication procedure over the registered identity verification technique, and a lost state cancellation unit configured to perform cancellation processing of an occurrence state of the lost password in the user terminal when the user identity verification succeeds.

In the present disclosure, the long-term memory condition may include at least one of a reference success time counted as a time passed since the password was set, and a reference success number counted as a number of authentication succeeded since the password was set.

Here, the user terminal may further include a success time collection unit configured to count a time passed since the password was set, and a success number collection unit configured to count a number of authentication succeeded since the password was set.

Also, the user terminal may further include a long-term memory change unit configured to notify the user, each time the long-term memory condition of the set password is initially satisfied, of the fact that the condition is satisfied, and to receive a consent to registration of satisfaction of the condition.

Here, the long-term memory change unit may initialize the counting information included in the long-term memory condition when the consent is rejected by the user.

According to one aspect of the present disclosure, the user terminal may omit the processing of the user identity verification and output a new password setting display, when the long-term memory condition is determined to be unsatisfied.

According to another aspect of the present disclosure, the user terminal may output notification to a screen to request the user to visit an authentication center, instead of providing the processing of the user identity verification, when the long-term memory condition is determined to be satisfied.

Here, the user terminal may change a mode, and the mode may include a password mode in which a password input is requested, a user identity verification mode in which user identity verification is requested when the long-term memory condition is unsatisfied after a lost password is determined to have occurred in the password mode, and a lock mode in which user manipulation is disallowed when the long-term memory condition is satisfied.

According to still another aspect of the present disclosure, the user terminal may further include an identity verification user unit configured to receive registration of user information of at least one second user able to verify a first user's identity when the first user forgot a password, to keep a lost password from occurring each password setting, and the user identity verification unit may perform authentication processing of the second user's answer in response to a question about the first user's identity.

Here, the system for processing a lost password may further include a call connection server configured to receive an occurrence event of a lost password from the user terminal, connect an automated response system (ARS) call between the first user and the second user, receive an answer inputted from the second user having confirmed the first user's identity via the connected call, and perform authentication processing of the received answer.

Preferably, the call connection server may request the second user to provide a predetermined answer during the call being connected, and receive, from the second user, an answer delivered from the first user in response to the request.

Further, the call connection server may connect ARS calls between the first user and n (n>1) second users when the long-term memory condition is determined to be satisfied, and determine the user identity verification as a success when n answers received from the second users are all successes.

To achieve the object, a method for processing a lost password using a user's long-term memory of the password according to the present disclosure corresponds to a method for processing a lost password by which a user terminal cancels a state of a lost password, and the method includes (a) a long-term memory condition registration step of receiving registration of a long-term memory condition for determining whether a user has long-term memory of a password, (b) a long-term memory condition determination step of determining whether the long-term memory condition is satisfied each time authentication processing of the password inputted from the user is attempted, (c) a user identity verification step of, after a lost password occurs due to failed authentication of the password, when non-long-term memory of the user is determined, performing authentication processing using a user identity verification technique registered upon setting the password, and when long-term memory of the user is determined, performing authentication processing using a user identity verification technique with an enhanced authentication procedure over the registered identity verification technique, and (d) a lost state cancellation step of performing cancellation processing of an occurrence state of the lost password in the user terminal when the user identity verification succeeds.

Advantageous Effects

According to one aspect of the present disclosure, there is provided an enhanced user identity verification service that determines whether or not a first user who forgot a password has long-term memory of the password and allows a second user to confirm the first user's identity using a call between the first user and the second user based on a result of the determination.

According to another aspect of the present disclosure, there is provided a more extensive user identity verification service, in which when a first user forgot a password while being in a long-term memory state, where there is suspicion that the password was stolen by a third party, the first user's identity is confirmed via calls with each of a plurality of second users.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

<1. System Architecture>

Figure 1:
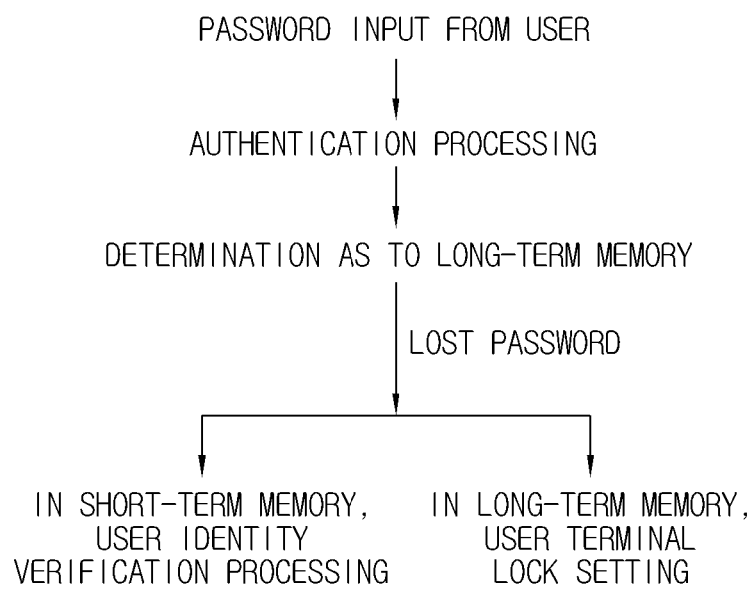
FIG. 1 is a schematic diagram illustrating an exemplary service provided by a lost password processing system a according to one embodiment of the present disclosure.

FIG. 1 is a schematic diagram illustrating an exemplary service provided by a lost password processing system according to one embodiment of the present disclosure.

The lost password processing system 1 according to one embodiment of the present disclosure receives an input of a password of a user and performs authentication processing of the inputted password. Here, when a user who does not remember a password fails to input a valid password into the system 1, the password becomes a lost password.

In the event of occurrence of the lost password, the system 1 determines whether or not the user has long-term memory of the password since setting the password. Since the user set the password, the user has short-term memory of the password, and afterwards, has long-term memory of the password. A possibility that the user will forget the password while being in a long-term memory state is lower than that of a short-term memory state.

If the user forgot the password while being in a short-term memory state, the system 1 may provide a user identity verification service to the user, and when the user's identity is confirmed by the service, may perform cancellation processing of the lost password. In contrast, if the user forgot the password while being in a long-term memory state, because the user forgot the password in spite of a very low likelihood that the user will forget the password, the system 1 needs to provide, to the user, a user identity verification service with a lower possibility of success of authentication when the user is in a long-term memory state than when the user is in a short-term memory state. That is, the user identity verification service in a long-term memory state should be an enhanced user identity verification service as compared to the user identity verification service in a short-term memory state. In this instance, various user identity verification means may be applied to the user identity verification service in a short-term memory state, and the user identity verification service in a short-term memory state may be omitted. If omitted, immediately when the user forgot the password while being is in a short-term memory state, the system 1 may notify the user of password setting.

Here, the lost password processing system 1 provides an enhanced user identity verification means as one of the various user identity verification means of the user identity verification service. The enhanced user identity verification means corresponds to an 'enhanced user identity verification service'. The enhanced user identity verification service involves, in the middle of the system's providing a user identity verification service to a user who forgot a password, verifying the user's identity through acquaintances of the user, rather than verifying the user's identity using user information inputted from the user. When the user's identity is confirmed through the acquaintances' input, the possibility of success of authentication becomes lower. Thus, as compared to known user identity verification services in which the user's identity is confirmed by the user alone, a user identity verification service in which the user's identity is confirmed by an acquaintance of the user is said to an enhanced user identity verification service.

Also, if the enhanced user identity verification service is provided to a user short-term memory of a password, a further enhanced user identity verification service should be provided to a user having long-term memory of a password. Hereinafter, the further enhanced user identity verification service being provided to a user having remembered a password for a long time is indicated as an 'extensive user identity verification service'.

Figure 2:
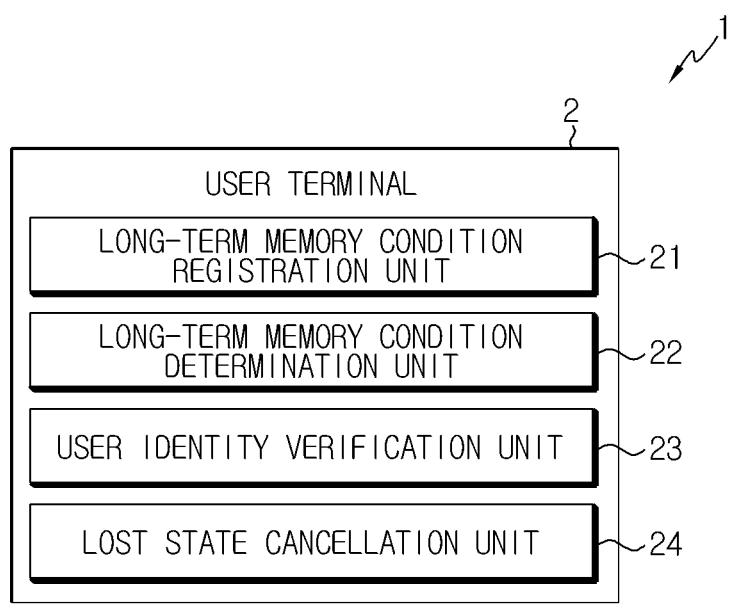
FIGS. 2 and 3 are schematic diagrams illustrating an internal structure of a user terminal according to one embodiment of the present disclosure.
Figure 3:
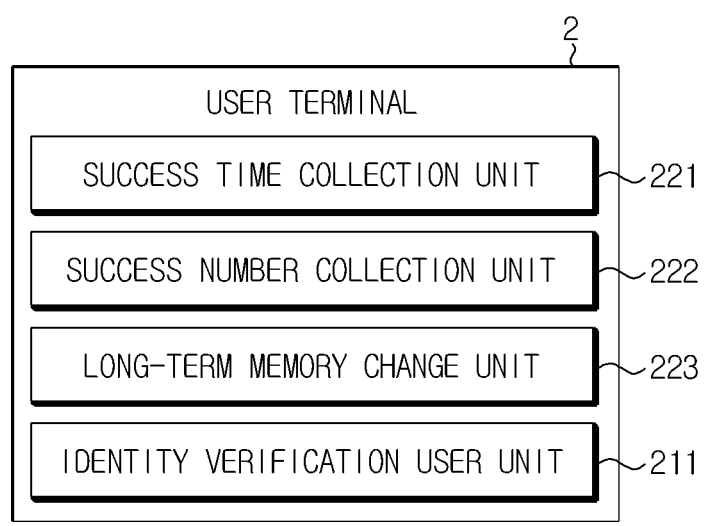

FIGS. 2 and 3 are schematic diagrams illustrating an internal structure of a user terminal 2 according to one embodiment of the present disclosure.

The lost password processing system 1 may be constructed to include the user terminal 2. The user terminal corresponds to a computer terminal (for example: desktop and laptop), a smart terminal, and a mobile terminal, and is not limited to a particular type if it has password setting, input, and authentication functions.

Here, in the event of occurrence of a lost password, the user terminal 2 determines whether or not a user has long-term memory of the password, performs user identity verification processing based on a result of the determination, and when user identity verification succeeds, provides a cancellation service of the lost password.

Referring to FIG. 2, the user terminal 2 according to one embodiment of the present disclosure is constructed to include a long-term memory condition registration unit 21 to receive registration of a condition for determining whether or not a user has long-term memory of a password, a long-term memory condition determination unit 22 to determine whether or not the long-term memory condition of the user is satisfied, a user identity verification unit 23 to provide a user identity verification service based on a result of the long-term memory determination of the user in the event of occurrence of a lost password, and a lost state cancellation unit 24 to perform cancellation processing of a lost state of the password when the user identity verification succeeds.

The long-term memory condition registration unit 21 receives registration of a long-term memory condition by the setting of a service administrator. Then, each time a user sets a password, the set long-term memory condition is notified to the user, and the long-term memory condition is equally applied to all users who set passwords. Alternatively, the long-term memory condition registration unit 21 may receive registration of a long-term memory condition from a user each time the user sets a password. When the user has long-term memory of the password, the long-term memory condition of the user and the password is satisfied. Also, when the user does not have long-term memory of the password (for example: short-term memory), the long-term memory condition of the user and the password is not satisfied.

Here, the long-term memory condition includes at least one of a reference success time and a reference success number set by the administrator. The reference success time (for example: 2400 hours, 1 month, etc.) refers to a cumulative time taken for the user to have long-term memory of the password. The reference success number (for example: 100 times) refers to a cumulative number of authentication successes of the password taken for the user to have long-term memory of the password.

The long-term memory condition determination unit 22 determines whether or not the long-term memory condition of the user is satisfied each time authentication processing is attempted in response to the password input from the user.

Here, when the user succeeds authentication of the password and a time taken to succeed the corresponding authentication exceeds the reference success time, the long-term memory condition determination unit 22 determines that the long-term memory condition of the user is satisfied. Likewise, when the user succeeds authentication of the password and the number of authentication successes of the corresponding password exceeds the reference success number, the long-term memory condition determination unit 22 determines that the long-term memory condition of the user is satisfied.

The user identity verification unit 23 verifies the user's identity using a user identity verification means set by the user based on a result of the determination of the long-term memory condition of the user in the event of occurrence of a lost password of the user.

Here, the user identity verification unit 23 may support various authentication processing including, but not limited to, authentication of a password for user identity verification other than the lost password, question and answer verification, or authentication number short message service (SMS) verification. To prevent a lost password from occurring, the user may preset a user identity verification means through the long-term memory condition registration unit 21. Then, the user identity verification unit 23 may verify the user's identity by referring to the user identity verification means set by the user. If omission of user identity verification is preset when the user forgot the password while the user is in a short-term memory state, processing by the user identity verification unit 23 may be omitted. Also, the user identity verification unit 23 may omit or provide a user identity verification service of the user using administrator default setting, instead of user setting.

When the user's identity is verified, the lost state cancellation unit 24 cancels the lost state of the password. The lost state cancellation unit 24 may output a new password setting display to the screen of the terminal 2 to notify the user of new password setting. When the new password setting is completed, the lost state of the password is cancelled. Alternatively, the lost state cancellation unit 24 may output the lost password to the screen.

Referring to FIG. 3, the user terminal 2 may be constructed to further include a success time collection unit 221, a success number collection unit 222, a long-term memory change unit 223, and an identity verification user unit 211.

The success time collection unit 221 counts, as a success time, a time passed since the password was set, each time authentication success of the password of the user occurs. The success time counted in real time is compared to the reference success time, and determination is made as to whether or not the long-term memory condition of the user is satisfied.

The success number collection unit 222 counts, as the number of successes, a number of authentication succeeded since the password was set, each time authentication success of the password of the user occurs. The number of successes counted in real time is compared to the reference success number, and determination is made as to whether or not the long-term memory condition of the user is satisfied.

Here, as needed, when user identity verification succeeds after the user forgot the password while being in a short-term memory state, the user terminal 2 may re-start counting by initializing the success time or success number collected in real time. Then, the user terminal 2 may determine that the user has insufficient time to memorize the password, and provide a sufficient amount of time through the initialization.

When the long-term memory condition is satisfied after an arbitrary password was set, the long-term memory change unit 223 may output to the screen of the user terminal 2 the fact that the long-term memory condition was satisfied, and ask the user if the user agrees to change to a long-term memory state of the password. The long-term memory change unit 223 may be omitted as it is an optional element. If omitted, when the long-term memory condition of the user is satisfied, condition satisfaction information is stored in a database (DB), and a change is thereby made to a long-term memory condition of the user. In terms of user security, it is preferred to omit the long-term memory change unit 223, but for the sake of user convenience, the long-term memory change unit 223 may be provided although it is difficult to cancel the lost state of the password in a long-term memory state.

Here, when a change is made to a long-term memory state of the password, because a user identity verification procedure becomes strict in the event of occurrence of lost password, the user may hesitate to accept the consent and reject the consent. In contrast, a user not worrying about forgetting a password selects confirmation of the consent. Then, the long-term memory change unit 223 registers a long-term memory state for a current password in the DB. After a change is made to a long-term memory state of the password and corresponding information is set in the DB, the user terminal 2 may look up the long-term memory state from the DB, thereby eliminating the necessity to count the success time or success number and removing the need to perform determination processing of the long-term memory condition.

If the user rejects the consent, the long-term memory change unit 223 may initialize the success time or success number counted in real time for convenience of the user. By the initialization, the short-term memory state of the user is extended.

The identity verification user unit 211 receives, from a first user who forgot a password, registration of user information of at least one second user able to verify the first user's identity as an enhanced user identity verification means and stores it in the DB each password setting, to keep a lost password from occurring.

Then, the user identity verification unit 23 may perform confirmation processing of a second user's answer to a question about the first user identity verification using the information of the second user as a user identity verification means.

For example, the user identity verification unit 23 may automatically connect a call from the first user who forgot the password to the second user, and receive registration of information about the first user's identity verification from the second user while the call is connected. The second user directly identifies a voice of the first user through the call with the first user, confirms the first user's identity, and in response, provides identity verification information.

Here, as the second user is requested to verify the first user's identity in person, the user identity verification unit 23 preferably routes a call and stores call information between the second user and the first user and answer information from the second user as history information. The stored history information corresponds to an evidence material proving that the second user heard the voice of the first user and verified the first user's identity. It is apparent that password security is enhanced because the first user's identity is verified by the second user confirming the first user's identity in response, when compared to the case in which the first user's identity is verified by the first user inputting personal information.

In this instance, in the event of occurrence of a lost password in the long-term memory state of the user, the user identity verification unit 23 may provide a more extensive user identity verification service in parallel with notifying of a visit to an after-sales service (AS) center.

For example, the user identity verification unit 23 may perform authentication processing for each of a plurality of second users. Assume n (n>1) second users are registered in the DB by the first user, the user identity verification unit 23 routs a call for each of the second users and collects n authentication processing results. Only when the n authentication results are all successes, user authentication processing is determined as a success. Because the n second users verify the first user's identity n times, it is apparent that authentication of identity verification is further enhanced. Obviously, in the long-term memory state of the user, online authentication using the n second users is more convenient than the user's visit to the AS center to cancel the lost password.

Figure 4:
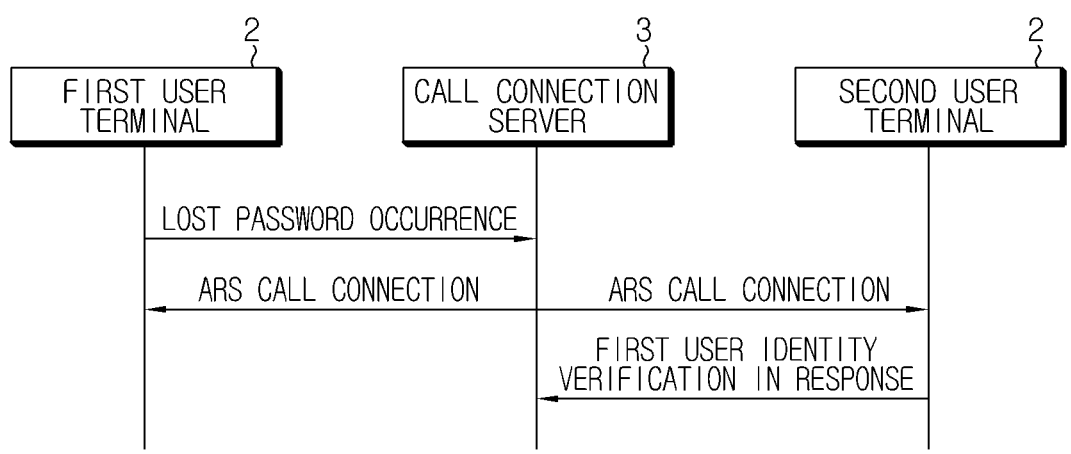
FIG. 4 is a schematic diagram illustrating an exemplary user identity verification service provided by a call connection server according to one embodiment of the present disclosure.

FIG. 4 is a schematic diagram illustrating an exemplary user identity verification service provided by a call connection server 3 according to one embodiment of the present disclosure.

The call connection server 3 according to one embodiment of the present disclosure performs, in the authentication using a second user, automated response system (ARS) call routing between the first and second users and authentication processing.

First, when a lost password occurs in the user terminal 2 in a non-long-term memory state, the call connection server 3 receives event occurrence information including phone numbers of the first user and the second user from the user terminal 2. The second user may be randomly selected from a plurality of users or may be selected by the first user.

Subsequently, the call connection server 3 routes an ARS call connection between the first user and the second user. When the call is connected, the call connection server 3 sends an audio notification to induce the second user to answer a question about the first user. In this process, the first user transmits a voice to the second user, and the second user receives the voice of the first user, and in response, confirms the first user's identity.

When a valid response is received from the second user, the call connection server 3 transmits an identity verification processing result to the user terminal 2. When the received identity verification processing result is a success, the user terminal 2 cancels the lost state of the password.

Here, the call connection server 3 may transmit an authentication code to the first user or the second user via SMS, and receive an audio input of the transmitted authentication code from the second user to which a call is being connected. In this instance, the second user may identify the voice of the first user during a call with the first user, and in response, provide a valid authentication code when the first user's identity is confirmed. Preferably, after transmitting an authentication code to the first user via SMS, the call connection server 3 induces the second user to naturally receive the authentication code from the first user during conversation while a call is being connected, and receives an answer from the second user. The call connection server 3 may receive, from the second user, the answer in the form of, for example, but not limited to, a button input or an audio. Also, the authentication code may be replaced with other information if the second user can receive it from the first user during the call conversation with the first user and provide an answer in response to the received question.

<2. Method Configuration>

A lost password processing method using a user's long-term memory of a password according to one embodiment of the present disclosure may be preferably realized through construction of the lost password processing system 1.

Figure 5:
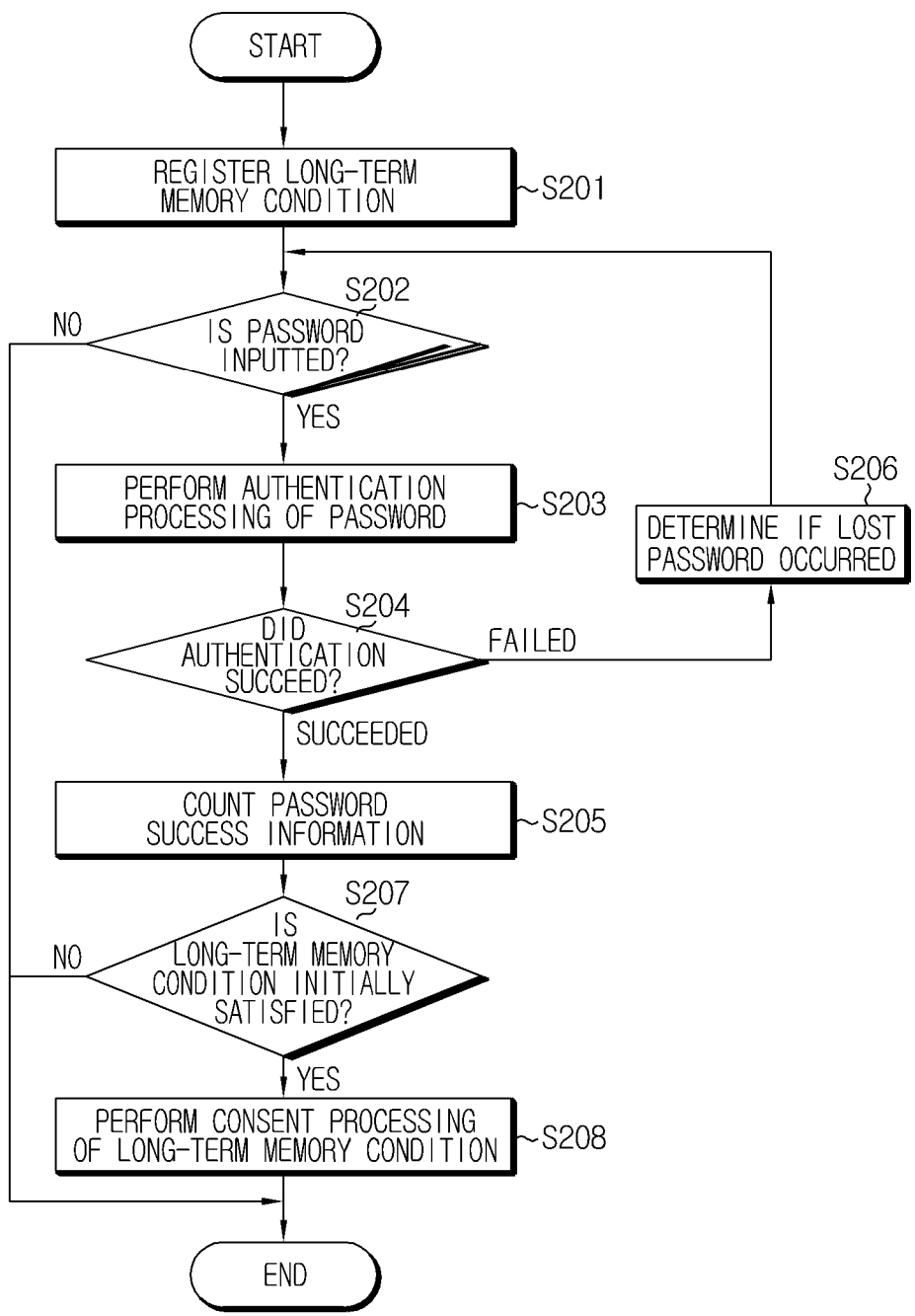
FIG. 5 is a flowchart schematically illustrating an authorization processing operation provided by a lost password processing method according to one embodiment of the present disclosure.

FIG. 5 is a flowchart schematically illustrating an authorization processing operation provided by a lost password processing method according to one embodiment of the present disclosure.

The user terminal 2 stores a long-term memory condition registered from an administrator in the DB (S201).

Here, the user terminal 2 receives registration of at least one of a reference success time and a reference success number registered by the administrator to determine whether or not a user has long-term memory of a password. Also, the user terminal 2 receives a selection of a user identity verification means from the user to verify the user's identity in the event of occurrence of a lost password. The user identity verification means may include, but is not limited to, a password scheme, a question/answer scheme, a certificate scheme, and a one-time password (OTP) scheme. If the user registers phone number information of a second user in accordance with a second user-based authentication scheme, because the user's identity is verified by the second user, the user terminal 2 may provide an enhanced user authentication service.

After the long-term memory condition is registered, when a password input event occurs in the user terminal 2 (S202), the user terminal 2 compares the inputted password to a pre-stored password, and when found identical, performs authentication processing to determine authentication as a success (S203).

When the user succeeds password authentication (S204), the user terminal 2 counts, as password success information, a success time or a success number of the password passed up to now (S205). Also, as the password is successfully authenticated, the user terminal 2 provides a corresponding service. If the password authentication of the user fails (S204), determination and cancellation processing of the lost password is performed, as described below through FIG. 6 (S206).

When the success information of the password is counted, the user terminal 2 compares the success information counted in real time to reference information registered in the DB, and determines whether or not the long-term memory condition of the user is initially satisfied when the success information exceeds the reference information (S207).

When the long-term memory condition is initially satisfied, the user terminal 2 may ask for consent by outputting to the screen the fact that the long-term memory condition of the user was satisfied (S208). When the user rejects the consent, the user terminal 2 prolongs a short-term memory state of the user by initializing information about the success time or success number counted in real time.

Figure 6:
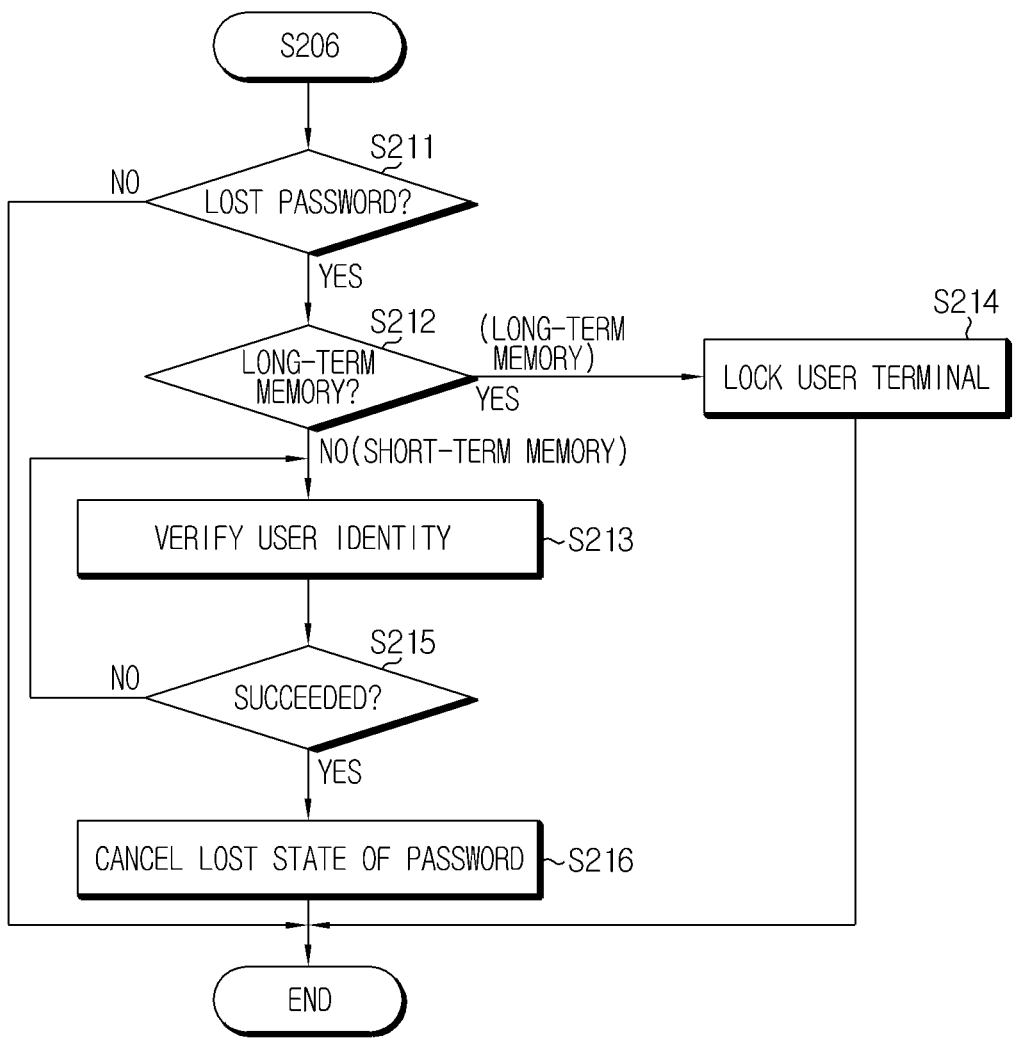
FIG. 6 is a flowchart schematically illustrating an operation of performing a lost password determination and cancellation processing step in FIG. 5.

FIG. 6 is a flowchart schematically illustrating an operation of performing the lost password determination and cancellation processing step S206 in FIG. 5.

First, the user terminal 2 determines whether or not a password for which authentication failed corresponds to a lost password (S211). When authentication of the password fails continuously a predetermined number of times or more, the user terminal 2 determines that the user forgot the password. When the user did not forget the password, the user attempts password re-input through S202.

When a lost password is determined to have occurred, the user terminal 2 determines whether or not the password long-term memory condition of the user who forgot the password is satisfied (S212). When the user's long-term memory of the password is not satisfied (short-term memory), the user terminal 2 provides a user identity verification service to verify the user's identity (S213).

Here, the user terminal 2 performs user identity verification by referring to a user identity verification means set by the user. If the referenced user identity verification means corresponds to identity verification by a second user for a first user who forgot a password, the user terminal 2 provides an enhanced user identity verification service to the user.

When a result of the user identity verification is a success (S215), the user terminal 2 cancels the lost state of the password (S216). Here, the user terminal 2 supports the user to succeed the authentication of the password by outputting the lost password or a password for a single use to the screen.

Figure 7:
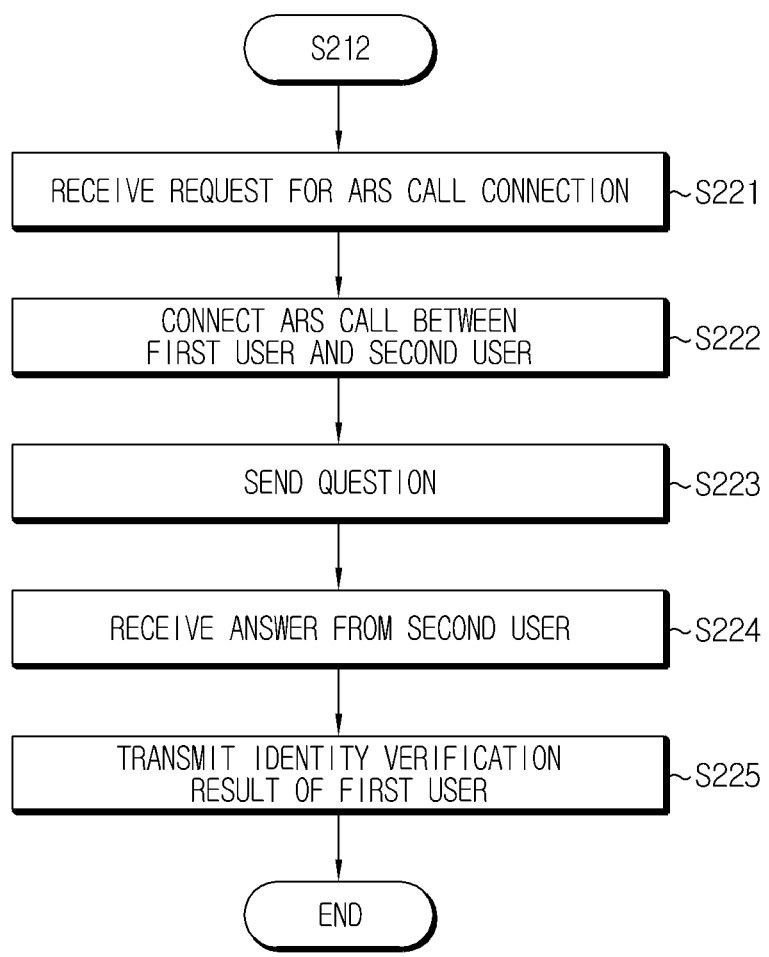
FIG. 7 is a flowchart schematically illustrating an enhanced user identity verification service that processes a user identity verification step in FIG. 6.

FIG. 7 is a flowchart schematically illustrating an enhanced user identity verification service that processes the user identity verification step S213 in FIG. 6.

The present disclosure provides an enhanced user identity verification service to verify a first user's identity through a second user with an aim of user identity verification.

First, the call connection server 3 receives event information about occurrence of a lost password in a short-term memory state from the user terminal 2, and is requested to connect an ARS call (S221). The event information includes phone number information of a first user who forgot a password and a second user designated by the first user. The call connection server 3 connects an ARS call between the first user and the second user (S222).

Subsequently, when the call is connected, the call connection server 3 requests the second user to verify the first user's identity by sending an automatic audio question (S223). The call connection server 3 may send an authentication code via SMS to request an input of the authentication code or an input of an answer to a question about the first user. Subsequently, the call connection server 3 receives an answer to the requested question from the second user (S224).

Here, after the call connection server 3 asks a question to the first user and requests the second user to answer the question, the first user may transmit his/her voice to the second user during a call to induce a natural conversion. For example, the question and answer may be preset by the first user (for example: a favorite color or number, a nickname, the name of school attended, etc.). Alternatively, the question and answer may be a part of address or phone number information of the first user (for example: city or county where the first user lives and a first or last digit of the phone number). As another example, the call connection server 3 may output an audio notification, for example, "Please have a talk, and if a person you are talking with is a first user, press No. 1, and if not, press No. 2". Then, the second user may naturally identify the first user during a natural conversation with the first user.

When an answer is received from the second user, the call connection server 3 compares the received answer to an answer stored in the DB, and when they match, determines the identity verification as a success. Also, in response, the call connection server 3 provides a result of processing the identity verification to the user terminal 2.

In this instance, at the step S214 of locking the user terminal 2 of FIG. 6, when the first user forgot the password while being in a long-term memory state, more extensive user identity verification is required. The user terminal 2 may notify the user to visit an AS center to carry out an offline user identity verification service while eliminating an online user identity verification service. The offline authentication requiring a visit to an AS center is one of the powerful user identity verification means as face-to-face authentication between a staff and a customer.

In this instance, the user should endure the convenience of having to visit the AS center, but the present disclosure may provide a more extensive user authentication service to the first user using the first user identity verification by the second user.

The call connection server 3 may request the first user identity verification by routing an ARS call connection to two or more second users or all the second users among a plurality of second users designated by the first user. Because the two or more second users individually verify the first use's identity, reliability of the authentication verification by the second user is definitely higher. Thus, because the first user's identity is confirmed based on high reliability, even though a third party knows personal information of the first user, it is impossible to deceive all the second users. The voice identification of the first user by the two second users through a phone call has a sufficiently reliable authentication processing result of identity verification to replace the visit authentication to the AS center. For this reason, when the first user has difficulty in visiting the AS center, it is more convenient to use authentication by multiple second users as an alternative.

In the foregoing exemplary embodiments, the term "~unit" is not used to represent hardware components of the lost password processing system 1. Thus, a plurality of components may be integrated into one component, and one component may be divided into a plurality of components. Also, the components may represent hardware components, but may also represent software components. Accordingly, it should be understood that the present disclosure is not specially limited by the term "~unit".

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A system for processing a lost password, comprising:
a user terminal comprising a processor and executable instructions which, when executed by the processor, implement:
 a term memory condition registration unit configured to receive registration of a term memory condition for determining whether a user has term memory of a password, wherein the term memory condition includes at least one of a reference success time counted as a time passed since the password was set, or a reference success number counted as a number of authentication succeeded since the password was set;
 a term memory condition determination unit configured to determine whether the term memory condition of the user is satisfied each time authentication processing of the password is attempted;
 a user identity verification unit configured to, in the event that a lost password is determined to have occurred due to failed authentication of the password, when non-term memory of the user is determined, perform authentication processing using a user identity verification technique registered upon setting the password, and when term memory of the user is determined, perform authentication processing using a user identity verification technique with an enhanced authentication procedure over the registered identity verification technique; and
 a lost state cancellation unit configured to perform cancellation processing of an occurrence state of the lost password in the user terminal when the user identity verification succeeds.

2. The system for processing a lost password according to claim 1, wherein the user terminal further comprises:
a success time collection unit configured to count a time passed since the password was set; and
a success number collection unit configured to count a number of authentication succeeded since the password was set.

3. The system for processing a lost password according to claim 1, wherein the user terminal further comprises:
a term memory change unit configured to notify the user, each time the term memory condition of the set password is initially satisfied, of the fact that the condition is satisfied, and to receive a consent to registration of satisfaction of the condition.

4. The system for processing a lost password according to claim 3, wherein the term memory change unit initializes counting information included in the term memory condition when the consent is rejected by the user.

5. The system for processing a lost password according to claim 1, wherein the user terminal omits the processing of the user identity verification and outputs a new password setting display, when the term memory condition is determined to be unsatisfied.

6. The system for processing a lost password according to claim 1, wherein the user terminal outputs notification to a screen to request the user to visit an authentication center, instead of providing the processing of the user identity verification, when the term memory condition is determined to be satisfied.

7. The system for processing a lost password according to claim 1, wherein the user terminal changes between modes, and
the modes comprise:
a password mode in which a password input is requested;
a user identity verification mode in which user identity verification is requested when the term memory condition is unsatisfied after a lost password is determined to have occurred in the password mode; and
a lock mode in which user manipulation is disallowed when the term memory condition is satisfied.

8. The system for processing a lost password according to claim 1, wherein the user terminal further comprises:
an identity verification user unit configured to receive registration of user information of at least one second user able to verify a first user's identity when the first user forgot a password each password setting, to keep a lost password from occurring, and
the user identity verification unit performs authentication processing of the second user's answer in response to a question about the first user's identity.

9. The system for processing a lost password according to claim 8, further comprising:
a call connection server configured to receive an occurrence event of a lost password from the user terminal, connect an automated response system (ARS) call between the first user and the second user, receive an answer inputted from the second user having confirmed the first user's identity via the connected call, and perform authentication processing of the received answer.

10. The system for processing a lost password according to claim 9, wherein the call connection server requests the second user to provide a predetermined answer during the call being connected, and receives, from the second user, an answer delivered from the first user in response to the request.

11. The system for processing a lost password according to claim 9, wherein the call connection server connects ARS calls between the first user and n (n>1) second users when the term memory condition is determined to be satisfied, and determines the user identity verification as a success when n answers received from the second users are all successes.

12. A method for processing a lost password by which a user terminal cancels a state of a lost password, the method comprising:
(a) a term memory condition registration step of receiving registration of a term memory condition for determining whether a user has term memory of a password, wherein the term memory condition includes at least one of a reference success time counted as a time passed since the password was set, or a reference success number counted as a number of authentication succeeded since the password was set;
(b) a term memory condition determination step of determining whether the term memory condition is satisfied each time authentication processing of the password inputted from the user is attempted;
(c) a user identity verification step of, after a lost password occurs due to failed authentication of the password, when non-term memory of the user is determined, performing authentication processing using a user identity verification technique registered upon setting the password, and when term memory of the user is determined, performing authentication processing using a user identity verification technique with an enhanced authentication procedure over the registered identity verification technique; and
(d) a lost state cancellation step of performing cancellation processing of an occurrence state of the lost password in the user terminal when the user identity verification succeeds.

13. The method for processing a lost password according to claim 12, further comprising:
before the step (b),
each time the user terminal performs authentication processing of the password,
counting, by the user terminal, a time passed since the password was set; and
counting, by the user terminal, a number of authentication succeeded since the password was set.

14. The method for processing a lost password according to claim 13, further comprising:
after the step (a),
notifying, by the user terminal, the user of the fact that the condition is satisfied each time the term memory condition of the set password is initially satisfied, and receiving a consent to registration of satisfaction of the condition.

15. The method for processing a lost password according to claim 14, further comprising:
initializing, by the user terminal, the counting information included in the term memory condition when the consent is rejected by the user.

16. The method for processing a lost password according to claim 12, wherein the step (b) comprises determining, by the user terminal, as the term memory condition, at least one condition of a first condition in which the time counted since the password was set exceeds the reference success time and a second condition in which a number of authentication successes of the password counted since the password was set exceeds the reference success number, and when the counted time exceeds the reference success time and the counted number exceeds the reference success number, determining that the term memory condition is satisfied.

17. The method for processing a lost password according to claim 12, wherein the step (c) comprises omitting, by the user terminal, the processing of the user identity verification using the registered user identity verification technique and outputting a new password setting display, when the term memory condition of the user is determined to be unsatisfied.

18. The method for processing a lost password according to claim 12, wherein the step (c) comprises outputting, by the user terminal, notification to a screen to request the user to visit an authentication center, instead of providing the processing of the user identity verification, when the term memory condition of the user is determined to be satisfied.

19. The method for processing a lost password according to claim 12, wherein the step (a) further comprises receiving, by the user terminal, registration of user information of at least one second user able to verify a first user's identity when the first user forgot a password, to keep a lost password from occurring each password setting, and
the step (c) comprises performing, by the user identity, authentication processing of the second user's answer in response to a question about the first user's identity.

20. The method for processing a lost password according to claim 19, wherein the step (c) comprises receiving, by a call connection server, an occurrence event of a lost password from the user terminal, connecting an automated response system (ARS) call between the first user and the second user, receiving an answer inputted from the second user having confirmed the first user's identity via the connected call, and performing authentication processing of the received answer and transmitting a result of the processing to the user terminal.

21. The method for processing a lost password according to claim 20, comprising:
requesting, by the call connection server, the second user to provide a predetermined answer during the call being connected, and receiving, from the second user, an answer delivered from the first user in response to the request.

22. The method for processing a lost password according to claim 20, further comprising:
connecting, by the call connection server, ARS calls between the first user and n (n>1) second users when the term memory condition is determined to be satisfied, and determining the user identity verification as a success when n answers received from the second users are all successes.

* * * * *